United States Patent
Hasu et al.

(10) Patent No.: US 9,076,233 B2
(45) Date of Patent: Jul. 7, 2015

(54) IMAGE PROCESSING DEVICE AND ELECTRONIC APPARATUS USING THE SAME

(71) Applicant: SEIKO EPSON CORPORATION, Tokyo (JP)

(72) Inventors: Tatsuhiro Hasu, Matsumoto (JP); Masaki Ishikawa, Tokyo (JP); Masanobu Kobayashi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 58 days.

(21) Appl. No.: 13/750,418

(22) Filed: Jan. 25, 2013

(65) Prior Publication Data
US 2013/0202202 A1 Aug. 8, 2013

(30) Foreign Application Priority Data
Feb. 3, 2012 (JP) ................. 2012-021643

(51) Int. Cl.
| | |
|---|---|
| G06K 9/36 | (2006.01) |
| G06T 3/40 | (2006.01) |
| G06T 5/00 | (2006.01) |
| G06T 5/50 | (2006.01) |
| H04N 5/235 | (2006.01) |
| H04N 19/15 | (2014.01) |
| H04N 19/12 | (2014.01) |
| H04N 19/186 | (2014.01) |

(52) U.S. Cl.
CPC ............ G06T 3/4053 (2013.01); H04N 5/2355 (2013.01); G06T 5/009 (2013.01); G06T 5/50 (2013.01); G06T 2207/10016 (2013.01); G06T 2207/10024 (2013.01); G06T 2207/10144 (2013.01); G06T 2207/20208 (2013.01); G06T 2207/20221 (2013.01); H04N 19/15 (2014.11); H04N 19/12 (2014.11); H04N 19/186 (2014.11)

(58) Field of Classification Search
None
See application file for complete search history.

(56) References Cited

U.S. PATENT DOCUMENTS

| | | | |
|---|---|---|---|
| 7,868,938 B2 | 1/2011 | Kurane | |
| 2001/0020979 A1* | 9/2001 | Lathrop | .................. 348/222 |
| 2007/0268396 A1 | 11/2007 | Kurane | |
| 2010/0020199 A1* | 1/2010 | Meitav et al. | ............ 348/231.99 |
| 2010/0328490 A1* | 12/2010 | Kurane et al. | ............. 348/229.1 |
| 2011/0090361 A1* | 4/2011 | Kobayashi et al. | ........ 348/222.1 |
| 2011/0254976 A1* | 10/2011 | Garten | ....................... 348/229.1 |
| 2011/0261237 A1* | 10/2011 | Yosefin | ......................... 348/272 |
| 2013/0050520 A1* | 2/2013 | Takeuchi | ................... 348/222.1 |

FOREIGN PATENT DOCUMENTS

| | | |
|---|---|---|
| JP | A 2006-14117 | 1/2006 |
| JP | A 2007-181051 | 7/2007 |
| JP | A 2007-329896 | 12/2007 |
| JP | A 2008-205530 | 9/2008 |
| JP | A 2008-236726 | 10/2008 |
| JP | A 2009-10691 | 1/2009 |

(Continued)

*Primary Examiner* — Li Liu

(74) *Attorney, Agent, or Firm* — Oliff PLC

(57) ABSTRACT

An image processing device includes a compression circuit adapted to perform compression of image data after sorting the pixels in an arrangement included in a plurality of lines in image data into a plurality of lines corresponding respectively to color components, a memory adapted to store the image data thus compressed, and an expansion circuit adapted to expand the image data thus compressed to restore the arrangement of the pixels.

12 Claims, 12 Drawing Sheets

(56) References Cited

FOREIGN PATENT DOCUMENTS

| | | |
|---|---|---|
| JP | A 2009-213032 | 9/2009 |
| JP | A 2009-267555 | 11/2009 |
| JP | A 2011-10108 | 1/2011 |
| JP | A 2011-101180 | 5/2011 |

* cited by examiner

[R] : ELEMENT (PIXEL) FOR RECEIVING LIGHT TRANSMITTED THROUGH RED FILTER
[G] : ELEMENT (PIXEL) FOR RECEIVING LIGHT TRANSMITTED THROUGH GREEN FILTER
[B] : ELEMENT (PIXEL) FOR RECEIVING LIGHT TRANSMITTED THROUGH BLUE FILTER

FIG. 5A RAW DATA
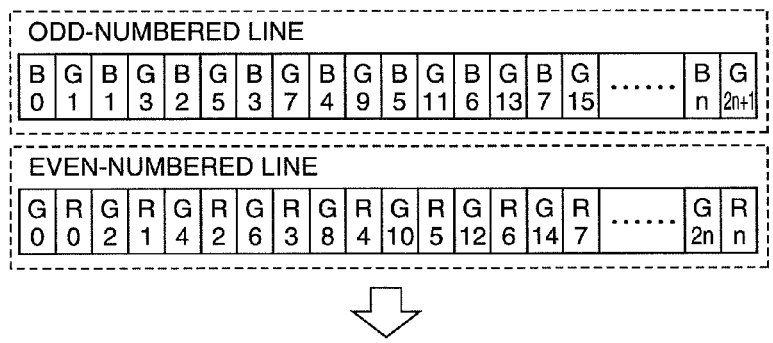
FIG. 5B IMAGE DATA AFTER SORTING
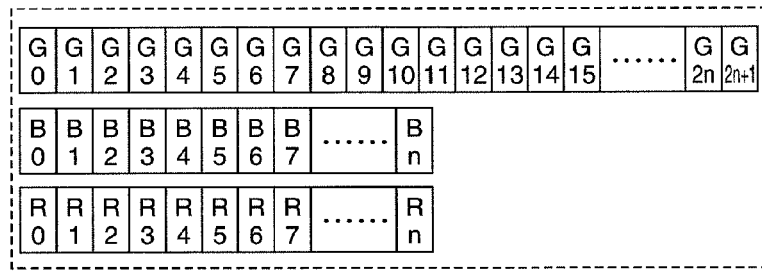

FIG. 6A RAW DATA
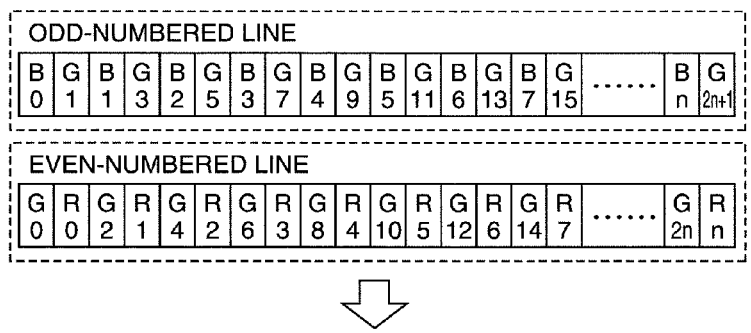
FIG. 6B IMAGE DATA AFTER SORTING
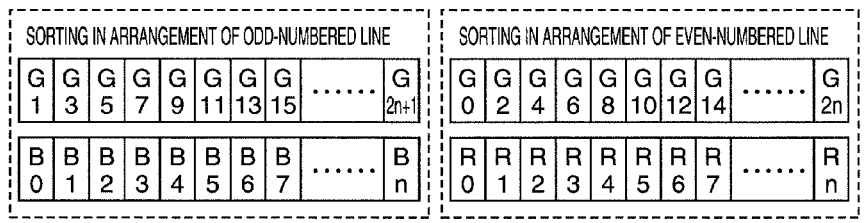

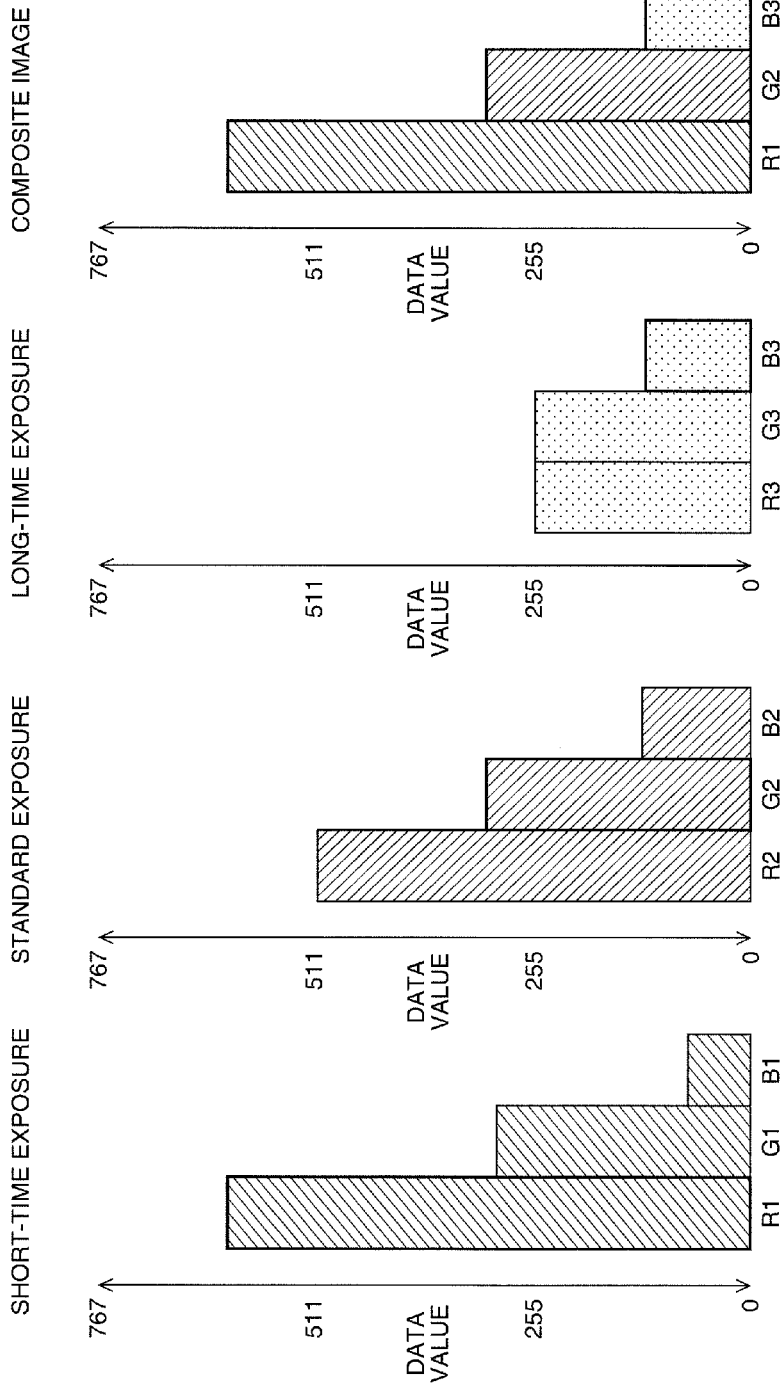

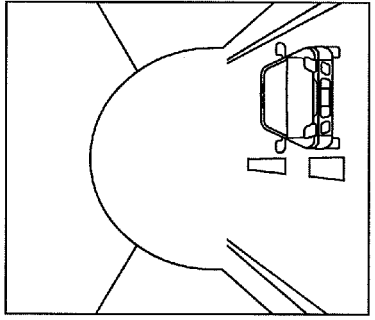
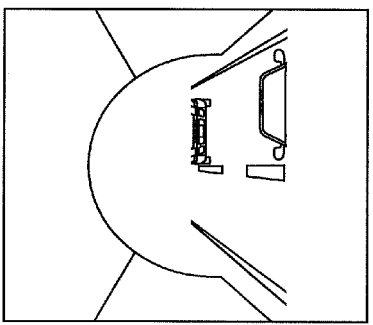
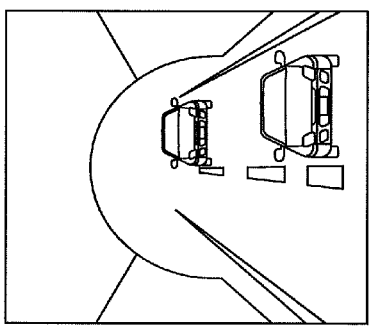
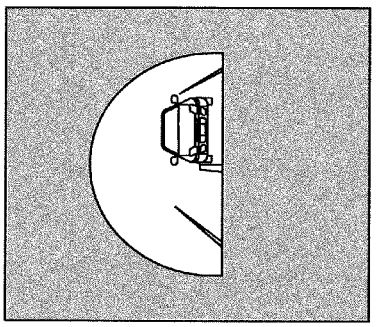

IMAGE PROCESSING DEVICE AND ELECTRONIC APPARATUS USING THE SAME

The entire disclosure of Japan Patent Application No. 2012-021643, filed Feb. 3, 2012 is expressly incorporated by reference herein.

BACKGROUND

1. Technical Field

Several aspects of the present invention relates to an image processing device for generating an image having a wide dynamic range with little blown out highlights and blocked up shadows by combining a plurality of images, which are shot while varying the exposure amount. Further, the invention relates to an electronic apparatus such as a drive recorder or a video camera for recording the image generated using such an image processing device.

2. Related Art

For example, the drive recorder is used for proving which driver is at fault or the like when a car accident occurs, and is therefore required to record a clear image. However, when shooting the vicinity of the end of a tunnel in daylight using the drive recorder, if the exposure amount is small, a bright object located outside the tunnel is shot clearly, but a dark object located inside the tunnel is shot in a state filled with black (blocked up shadows). In contrast, if the exposure amount is large, the dark object located inside the tunnel is shot clearly, but the bright object located outside the tunnel is shot in a state saturated to white (blown out highlights).

Therefore, it is possible to use the high dynamic range (HDR, also referred to as wide dynamic range (WDR)) composition in the drive recorder. The high dynamic range composition is a technique for generating an image (HDR image) having a wide dynamic range with little blown out highlights and blocked up shadows by shooting a plurality of images while varying the exposure amount and then combining the images (see, e.g., JP-A-2009-213032 (paragraphs 0006-0012) and JP-A-2007-329896 (paragraphs 0004-0009)). According to the high dynamic range composition, in the case in which the vehicle drives around the end of a tunnel or the case of backlight, an image with little blown out highlights and blocked up shadows can be obtained.

In the related art, the HDR image is generated by once storing the image data, which represents a plurality of images obtained by performing shooting with imaging element while varying the exposure time, in a frame memory, and then combining the image data, which is read out from the frame memory, in the HDR image processing circuit. Therefore, the amount of image data stored in the frame memory, and the transmission band (the transmission bit rate) of the image data to be transmitted between the HDR image processing circuit and the frame memory increase in accordance with the number of the images different in exposure time from each other.

As a related technology, there is disclosed in JP-A-2006-14117 (abstract) a physical information acquisition method capable of achieving a frame rate equivalent to that in the normal operation and low power consumption in an imaging device having a dynamic range expansion processing function. In this physical information acquisition method, in an area composed of a plurality of lines (horizontal rows) contiguous in a vertical column direction out of the entire imaging range in a solid-state imaging element, the area is divided into a plurality of (e.g., three) regions in the vertical column direction, and some (e.g., a region B) of the regions is treated as a valid region having a contribution to the dynamic range expansion process, and then a plurality of image signals are obtained at the same processing speed as the processing speed at which the processing object signals are obtained from the entire detection region under the conditions different in exposure time from each other using the region B. However, according to JP-A-2006-14117 (abstract), it results that the image signals are obtained from only a part of the detection region in the solid-state imaging element.

In view of such circumstances, there is a high probability that the amount of the image data to be transferred between the HDR image processing circuit and the frame memory and the transmission bit rate thereof are the bottleneck for achieving further expansion of the dynamic range of the HDR image, a higher resolution thereof, or a higher frame rate thereof.

If the storage capacity of the frame memory is increased, the frequency of the transfer clock signal is raised, or the width of the bus line of the frame memory is increased in order to eliminate the bottleneck, increase in cost is incurred, which makes it difficult to realize such improvement items as described above. Further, also in the case in which it is attempted that the HDR image processing circuit is incorporated in a system-on-chip together with a posterior system, a problem or a restriction on the memory capacity or an internal bus frequency occurs when integrating the frame memory for the HDR composition and the memory of the posterior system.

SUMMARY

An advantage of some aspects of the invention is to enable an image processing device for performing the HDR composition to reduce the amount of an image data to be transferred between a memory, which stores the image data representing a plurality of images shot while varying the exposure amount, and an HDR image processing circuit to thereby drop the transmission bit rate of the image data.

An image processing device according to one aspect of the invention includes an image data acquisition section adapted to obtain a plurality of types of image data respectively representing a plurality of color images in which a shooting object is shot with respective exposure amounts different from each other, a compression circuit adapted to compress the image data after sorting pixels included in a plurality of lines and having an arrangement into a plurality of lines corresponding respectively to color components in at least one type of image data obtained by the image data acquisition section, a memory adapted to store the plurality of types of image data including the at least one type of image data, which is obtained by the image data acquisition section and then compressed by the compression circuit, as much as at least one frame for each of the types, an expansion circuit adapted to expand the image data compressed out of the plurality of types of image data read out from the memory, and then restore the arrangement of the pixels included in the plurality of lines in the image data expanded, an interpolation circuit adapted to perform an interpolation operation using data values of peripheral pixels on each of the pixels in the plurality of types of image data including the at least one type of image data, which is read out from the memory and then expanded and restored by the expansion circuit, to thereby output image data including the plurality of color components for each of the pixels, and a dynamic range expansion circuit adapted to combine the plurality of types of image data output from the interpolation circuit to thereby generate composite image data representing a single color image with a dynamic range expanded.

The image processing device may be configured such that an odd-numbered line in the image data obtained by the image data acquisition section includes the pixels representing a first color component and the pixels representing a second color component, an even-numbered line in the image data includes the pixels representing the second color component and the pixels representing a third color component, and the compression circuit sorts the pixels in an arrangement included in a plurality of lines adjacent to each other in the at least one type of image data into a row of the pixels representing the first color component, a row of the pixels representing the second color component, and a row of the pixels representing the third color component.

In particular, the image processing device may be configured such that the compression circuit sorts the pixels in an arrangement included in two lines adjacent to each other in the at least one type of image data into one row of the pixels representing the first color component, two rows of the pixels representing the second color component, and one row of the pixels representing the third color component.

The image processing device described above may be configured such that the compression circuit sorts the pixels in an arrangement included in the plurality of lines in the at least one type of image data into the plurality of lines corresponding respectively to the color components in accordance with a setting signal representing information of a color filter used when an image represented by the image data obtained by the image data acquisition section is generated.

An electronic apparatus according to one aspect of the invention includes an imaging section adapted to generate a plurality of types of image data respectively representing a plurality of color images in which a shooting object is shot with respective exposure amounts different from each other by shooting the shooting object with the respective exposure amounts different from each other, and any of the image processing devices described above to which the plurality of types of image data generated by the imaging section is supplied.

According to the aspect of the invention, by compressing the image data after sorting the pixels in an arrangement included in a plurality of lines in at least one type of image data obtained by the image data acquisition section into a plurality of lines corresponding respectively to the color components, and then storing the image data thus compressed in the memory, it is possible to reduce the amount of the image data transferred between the HDR image processing circuit and the memory to thereby decrease the transmission bit rate of the image data.

BRIEF DESCRIPTION OF THE DRAWINGS

The invention will be described with reference to the accompanying drawings, wherein like numbers reference like elements.

FIGS. 5A and 5B are diagrams for explaining a first example of sorting in a pixel arrangement.

FIGS. 6A and 6B are diagrams for explaining a second example of the sorting in the pixel arrangement.

FIGS. 9A through 9D are diagrams for explaining a first example of an image composition process.

FIGS. 11A through 11D are diagrams showing an example of images shot by a drive recorder.

DESCRIPTION OF EXEMPLARY EMBODIMENTS

Hereinafter, some embodiments of the invention will be explained in detail with reference to the accompanying drawings. It should be noted that the same constituents are denoted with the same reference symbols, and the duplicated explanation will be omitted.

Figure 1:
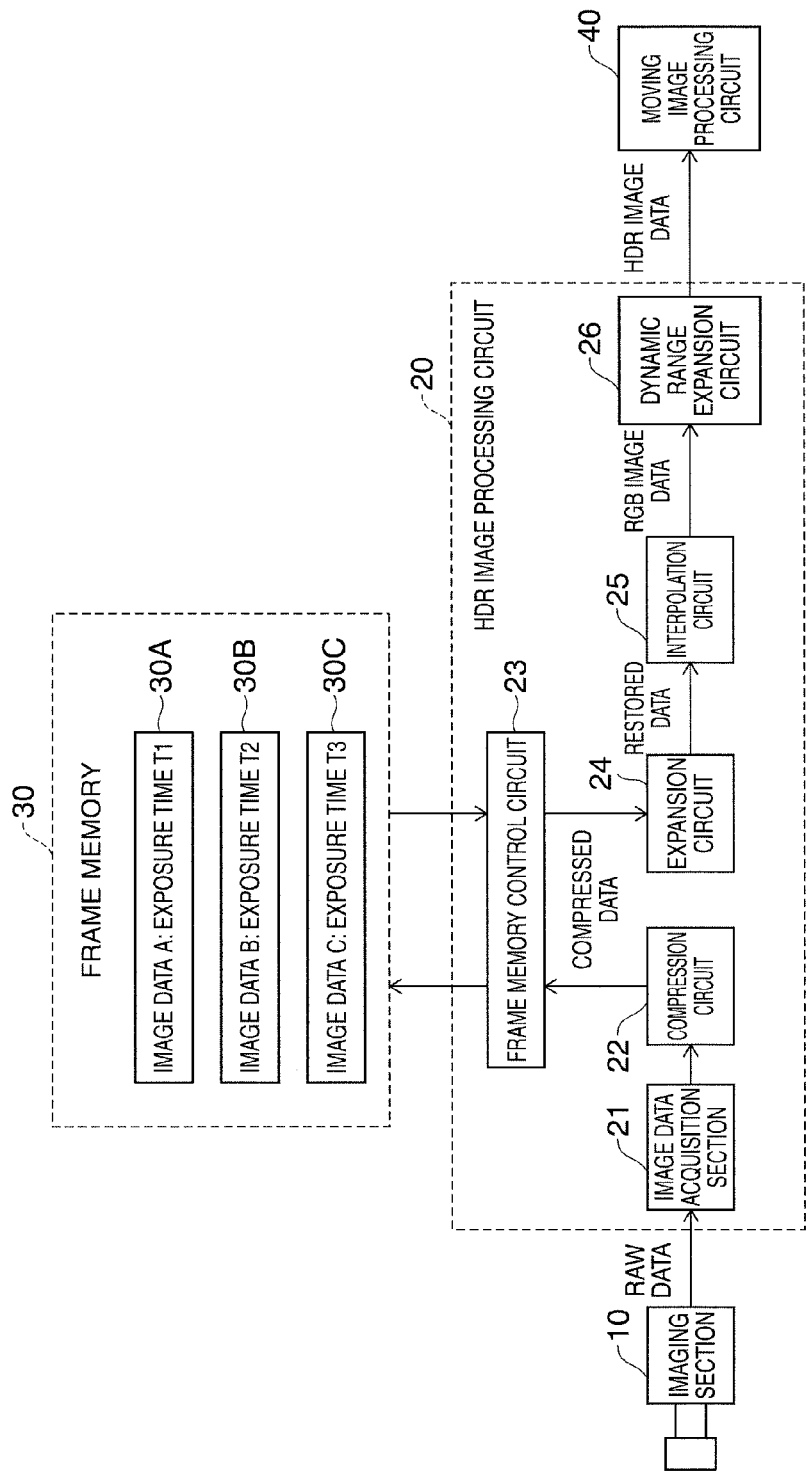
FIG. 1 is a block diagram showing an electronic apparatus using an image processing device according to a first embodiment of the invention.

FIG. 1 is a block diagram showing a configuration example of an electronic apparatus using an image processing device according to a first embodiment of the invention. According to the first embodiment of the invention, it is possible to realize an electronic apparatus such as a drive recorder or a video camera for recording an HDR image generated by an image processing device.

As shown in FIG. 1, the electronic apparatus includes an imaging section 10, an HDR image processing circuit 20, a frame memory 30, and a moving image processing circuit 40. Here, at least the HDR image processing circuit 20 and the frame memory 30 constitute an image processing device. Further, the HDR image processing circuit 20, the frame memory 30, and the moving image processing circuit 40 can also be formed of a single semiconductor integrated circuit (IC), or can also be formed of individual semiconductor integrated circuits, respectively.

The imaging section 10 includes a two-dimensional sensor using imaging elements such as charge coupled devices (CCD), and shoots a shooting object (an object) with exposure amounts different from each other. Thus, the imaging section 10 generates a plurality of types of image data respectively representing a plurality of color images in which the shooting object is shot with the respective exposure amounts different from each other.

Hereinafter, the case in which the CCD is used in the two-dimensional image sensor, and the image data A, B, and C are generated by shooting the shooting object with the respective exposure times T1, T2, and T3 different from each other will be explained. The exposure time T1 of the image represented by the image data A, the exposure time T2 of the image represented by the image data B, and the exposure time T3 of the image represented by the image data C have a relationship of T1<T2<T3, and it is assumed that, for example, T1:T2:T3=2:3:6 is satisfied.

Here, it is assumed that the exposure time T2 with which a medium exposure amount can be obtained is a standard exposure time, and an image of the shooting object shot with the standard exposure time is a standard image. It should be noted that in the case of obtaining four or more images by shooting the shooting object with four or more levels of exposure amounts, it is possible to select one image as the standard image out of the images except the image shot with the minimum exposure amount and the image shot with the maximum exposure amount.

Figure 2:
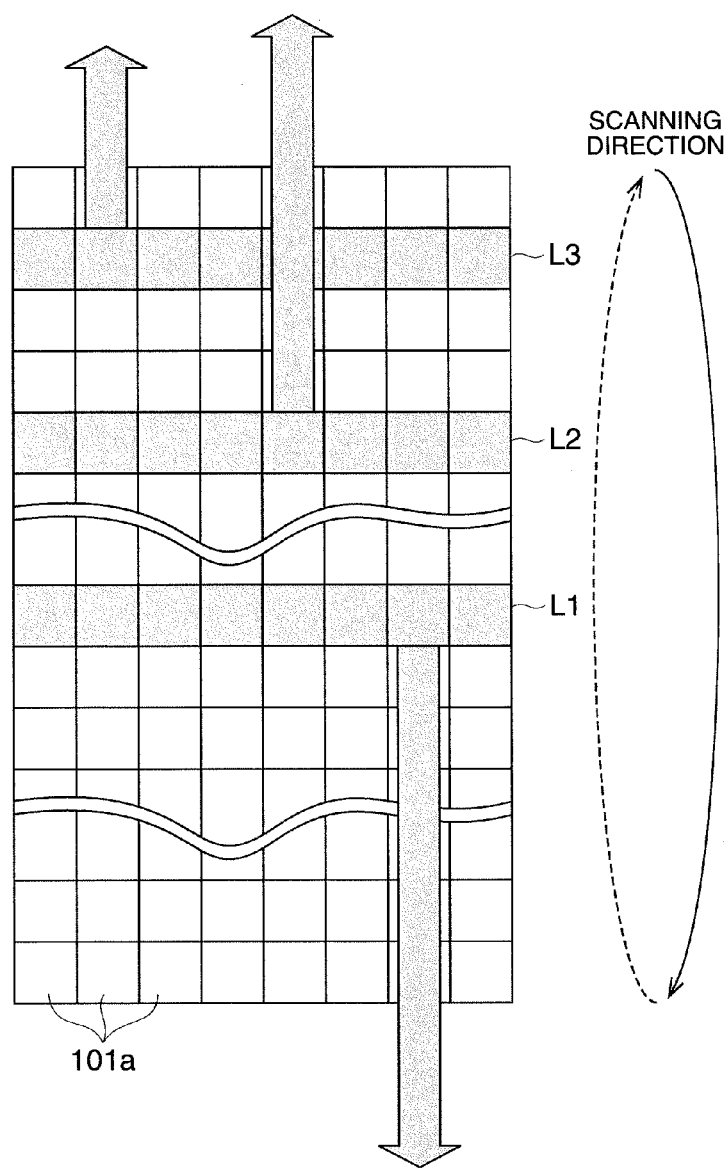
FIG. 2 is a diagram for explaining an operation of a two-dimensional image sensor.

FIG. 2 is a diagram for explaining the operation of the two-dimensional image sensor shooting the shooting object with the exposure times different from each other. In the exposure area of the two-dimensional image sensor 101 including the CCD 101a, there are disposed three read-out lines L1, L2, and L3 in order to read out the charge stored in the CCD 101a. The CCD 101a is repeatedly scanned in a scanning direction shown in the drawing, and the charge stored in each CCD 101a is read out. The charges read out from the read-out lines L1 through L3 are input to an A/D conversion section via an analog front end (AFE) not shown, and are then converted into the image data.

The read-out line L1 is a read-out line used for reading out the charges stored in the smallest number of CCDs. Based on the charges read out from the read-out line L1, image data A representing the image with the shortest exposure time is generated. Further, based on the charges read out from the read-out line L2, image data (the standard image data) B representing the standard image with the standard exposure time is generated. The read-out process from the read-out lines L1, L2 is a non-destructive read-out process without reset.

The read-out line L3 is a read-out line used for reading out the charges stored in the largest number of CCDs, and at the same time resetting the CCDs. The read-out process with reset is also called a destructive read-out process. Based on the charges read out from the read-out line L3, image data C representing the image with the longest exposure time is generated.

In each shooting process, the non-destructive read-out process from the read-out line L1, the non-destructive read-out process from the read-out line L2, and the destructive read-out process from the read-out line L3 are performed independently from each other. Such control of the read-out timing is realized by an electronic shutter function. It should be noted that the invention is not limited to such a configuration, but it is also possible to control the aperture of the imaging section to change the exposure amount.

Incidentally, in order to perform color photography using the two-dimensional image sensor, it is necessary to decompose the light into the three primary colors using a color filter. In general, by adopting a Bayer pixel arrangement as the arrangement of the color filter disposed on a plurality of imaging elements (pixels) included in the two-dimensional image sensor, reduction of the total number of pixels is achieved. The color filter of the imaging section 10 shown in FIG. 1 is also arranged with the Bayer pixel arrangement.

Specifically, odd-numbered lines of the two-dimensional image sensor include the elements for receiving the transmitted light from the filter for transmitting a first color component and the elements for receiving the transmitted light from the filter for transmitting a second color component arranged alternately. Further, even-numbered lines of the two-dimensional image sensor include the elements for receiving the transmitted light from the filter for transmitting the second color component and the elements for receiving the transmitted light from the filter for transmitting a third color component arranged alternately.

Figure 3:
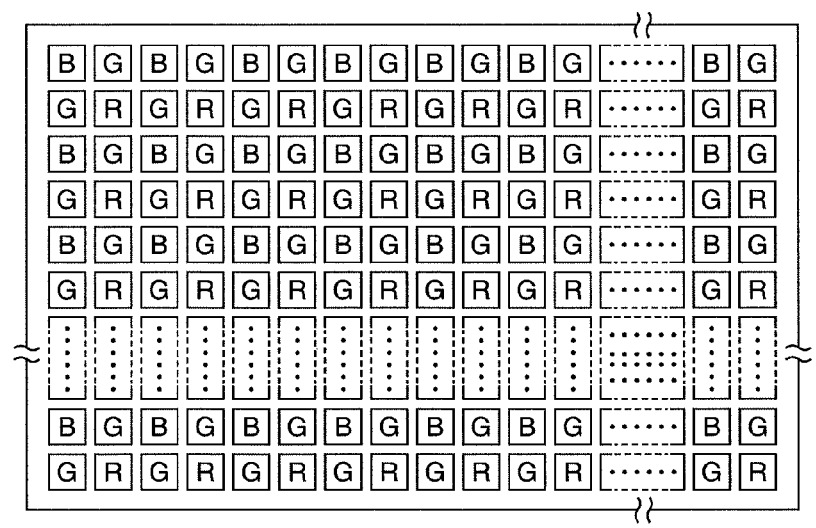
FIG. 3 is a diagram showing an arrangement example of a color filter in an imaging section shown in FIG. 1.

FIG. 3 is a diagram showing an arrangement example of the color filter in the imaging section shown in FIG. 1. In this example, it is assumed that the first color component is blue (B), the second color component is green (G), and the third color component is red (R). In this case, the resolution of green (G) is N/2 with respect to the total number of pixels N of the two-dimensional image sensor, and the resolution of blue (B) and red (R) is N/4. Here, the reason that the green (G) pixels are disposed twice as many as the blue (B) or red (R) pixels is that the spectral sensitivity of human eyes has a peak around green, and it leads to improvement of the apparent resolution to raise the resolution of green.

Thus, it results that the odd-numbered lines include the pixels representing the first color component and the pixels representing the second color component arranged alternately in the image data generated by the imaging section 10 shown in FIG. 1. Further, it results that the even-numbered lines include the pixels representing the second color component and the pixels representing the third color component arranged alternately. As described above, each of the pixels of the image data generated by the imaging section 10 includes a single color component. The image data is supplied to the HDR image processing circuit 20 line by line as RAW data (raw data).

The HDR image processing circuit 20 stores a plurality of types of image data supplied from the imaging section 10 once in the frame memory 30, and then combines the plurality of types of image data readout from the frame memory 30 to thereby generate composite image data (HDR image data) representing a single color image with the dynamic range expanded.

As shown in FIG. 1, the HDR image processing circuit 20 includes an image data acquisition section 21, a compression circuit 22, a frame memory control circuit 23, an expansion circuit 24, an interpolation circuit 25, and a dynamic range expansion circuit 26. The image data acquisition section 21 obtains the plurality of types of image data respectively representing the plurality of color images in which the shooting object is shot with the respective exposure amounts different from each other from the imaging section 10.

For example, it is assumed that the 30 frames of HDR images are generated per second based on the 10 bits RAW data (the exposure times T1, T2, and T3) output from the imaging section 10. In the case in which the two-dimensional image sensor has the VGA size (640 pixels in the horizontal direction, 480 pixels in the vertical direction), the transfer rate of 640×480×10×3×30×2÷8≈69 MBps is required in order to simultaneously perform writing and reading of the image data. In reality, since the image data not used for generation of the HDR images and the image data corresponding to one frame as an initial value before the exposure are also obtained, the transfer rate can be about 100 MBps in some cases. In the case in which the two-dimensional image sensor has the full HD size (1920 pixels in the horizontal direction, 1080 pixels in the vertical direction), the transfer rate of about 467 MBps by simple arithmetic, or about 630 MBps depending on the realization method, is required.

The transfer rate of about 467 MBps through about 630 MBps is equal to or higher than the transfer rate, which requires to use almost entire ideal effective band of a typical single data rate (SDR) SDRAM with a bus width of 32 bits, or a double data rate (DDR) SDRAM with a bus width of 16 bits. Further, the data capacity is as large as about 16 MB through about 21 MB.

Therefore, in the present embodiment there is provided the compression circuit 22 for compressing at least one type of image data prior to storing the plurality of types of image data obtained by the image data acquisition section 21 to the frame memory 30. Since the image data is supplied line by line from the imaging section 10 to the image data acquisition section 21, an algorithm completed in every line or every two lines is suitable as the compression process in the compression circuit 22. The reason is that in order to compress the image data in the two-dimensional state (8×8 pixels) as in JPEG (Joint Photographic Experts Group), a buffer memory for holding the image data corresponding to several lines is required.

Further, since the color filter of the imaging section 10 has the Bayer pixel arrangement, the RAW data of the pixels adjacent to each other is based on the light intensities of the lights transmitted through the color filters of respective colors different from each other, and therefore, the continuity of the data value in the pixels adjacent to each other is poor. Therefore, a typical image compression algorithm using the continuity of the data value in the pixels adjacent to each other is not suitable for the RAW data on which no interpolation operation has been performed.

Therefore, the compression circuit 22 performs sorting in the arrangement of the pixels included in a plurality of lines for each of the plurality of color components in at least one type of image data out of the plurality of types of image data obtained by the image data acquisition section 21, and then compresses the image data and stores the image data in the frame memory 30. In accordance therewith, the expansion circuit 24 expands the image data thus compressed out of the plurality of types of image data readout from the frame memory 30, and then restores the arrangement of the pixels included in a plurality of lines in the image data thus expanded.

Figure 4:
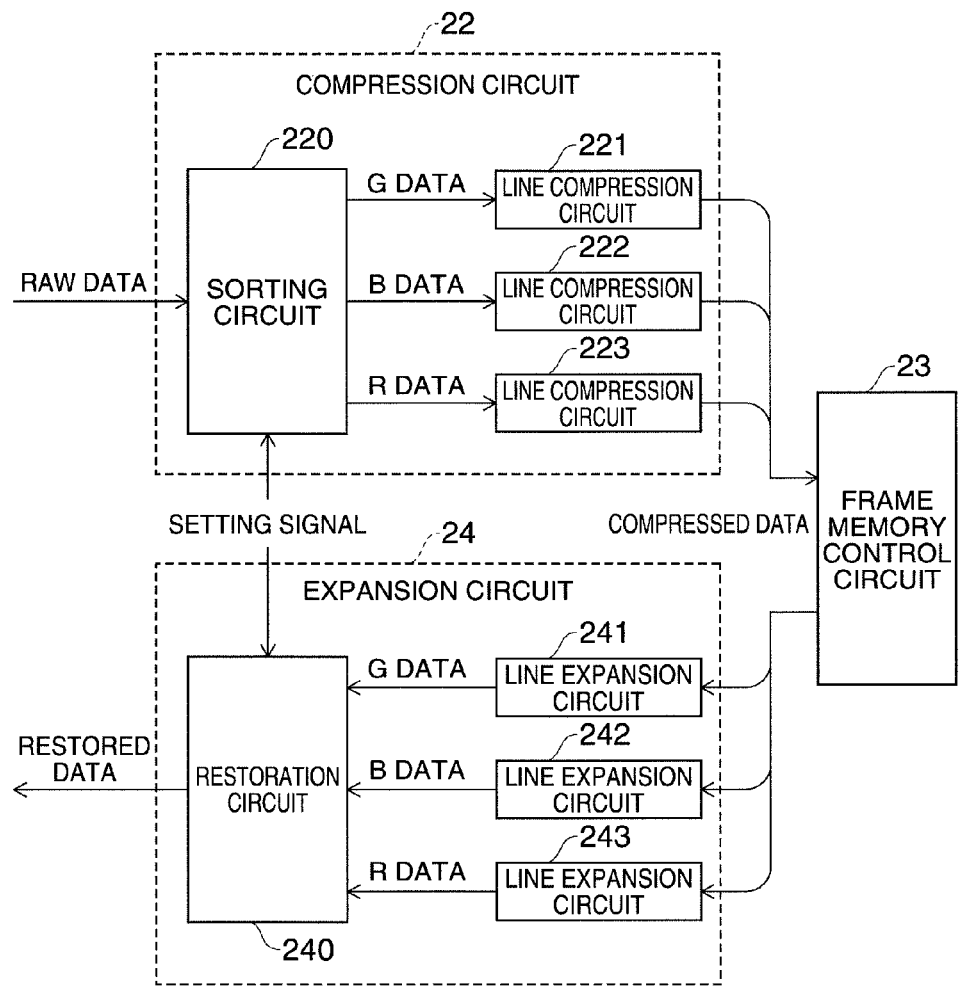
FIG. 4 is a block diagram showing a configuration example of a compression circuit and an expansion circuit shown in FIG. 1.

FIG. 4 is a block diagram showing a configuration example of the compression circuit and the expansion circuit shown in FIG. 1. As shown in FIG. 4, the compression circuit 22 includes a sorting circuit 220 and line compression circuits 221 through 223. The sorting circuit 220 performs sorting in the arrangement of the pixels included in a plurality of lines adjacent to each other in at least one type of image data into a row of the pixels representing the first color component, a row of the pixels representing the second color component, and a row of the pixels representing the third color component.

For example, the sorting circuit 220 performs the sorting in the arrangement of the pixels included in the two lines adjacent to each other in at least one type of image data into the row of the pixels representing green (G), the row of the pixels representing blue (B), and the row of the pixels representing red (R) in accordance with a setting signal representing the information of the color filter used when the RAW data obtained by the image data acquisition section 21 is generated, to thereby output G data, B data, and R data. The line compression circuits 221 through 223 respectively compress the G data, the B data, and the R data, which are output from the sorting circuit 220, line by line.

The plurality of types of image data includes at least one type of image data, which is compressed by the compression circuit 22, and the frame memory control circuit 23 controls the frame memory 30 (FIG. 1) so as to store the plurality of types of image data as much as an amount corresponding to one frame for each of the types. It should be noted that with respect to the image data not compressed, the compression circuit 22 outputs the image data obtained by the image data acquisition section 21 without change.

For example, the compression circuit 22 compresses image data A, B, and C respectively representing three color images in which the shooting object is shot with the respective exposure times T1, T2, and T3. The frame memory 30 stores the image data A, B, and C thus compressed in respective storage areas 30A, 30B, and 30C. On the other hand, if the compression is not performed on the standard image data B, for example, the frame memory 30 stores the image data A and C thus compressed in the respective storage areas 30A and 30C, and stores the image data B not compressed in the storage area 30B.

Further, the frame memory control circuit 23 reads out the plurality of types of image data from the frame memory 30, and then supplies it to the expansion circuit 24. The expansion circuit 24 expands the image data thus compressed out of the plurality of types of image data read out from the frame memory 30. Further, the expansion circuit 24 restores the arrangement of the pixels included in the plurality of lines in the image data thus expanded to thereby output restored data, which is identical to the RAW data or roughly equal to the RAW data. It should be noted that with respect to the image data not compressed, the expansion circuit 24 outputs the image data read out from the frame memory 30 without change.

As shown in FIG. 4, the expansion circuit 24 includes a restoration circuit 240 and line expansion circuits 241 through 243. The line expansion circuits 241 through 243 respectively expand the G data, the B data, and the R data, which are output from the frame memory control circuit 23, line by line. The restoration circuit 240 restores the arrangement of the pixels included in the plurality of lines in the G data, the B data, and the R data expanded by the line expansion circuits 241 through 243. For example, the restoration circuit 240 restores the arrangement of the pixels included in the plurality of lines in accordance with the setting signal representing the information of the color filter used when the RAW data, which is obtained by the image data acquisition section 21, is generated.

FIGS. 5A and 5B are diagrams for explaining a first example of sorting in the arrangement of the pixels included in the plurality of lines in the image data. FIG. 5A shows the arrangement of the pixels included in the odd-numbered line and the arrangement of the pixels included in the even-numbered line in the RAW data, and FIG. 5B shows the arrangement of the pixels in the image data after the sorting.

As shown in FIG. 5A, the odd-numbered line includes the pixels B0, B1, B2, ... Bn representing blue (B), and the pixels G1, G3, G5, ..., G(2n+1) representing green (G) alternately in the RAW data. Further, the even-numbered line includes the pixels G0, G2, G4, ..., G(2n) representing green (G), and the pixels R0, R1, R2, ..., Rn representing red (R) alternately in the RAW data.

By performing the sorting in the arrangement of the pixels included in the odd-numbered line and the even-numbered line in the RAW data, such an arrangement of the pixels as shown in FIG. 5B can be obtained. In the image data after the sorting, the first line includes the pixels G0, G1, G2, ..., G2n, G(2n+1) representing green (G), the second line includes the pixels B0, B1, B2, ..., Bn representing blue (B), and the third line includes the pixels R0, R1, R2, ..., Rn representing red (R). As described above, in the first example, the number of lines increases from two to three, and at the same time, the number of pixels representing green (G) included in the first line becomes twice as large as the number of pixels representing blue (B) included in the second line or the number of pixels representing red (R) included in the third line.

FIGS. 6A and 6B are diagrams for explaining a second example of the sorting in the arrangement of the pixels included in the plurality of lines in the image data. FIG. 6A shows the arrangement of the pixels included in the odd-numbered line and the arrangement of the pixels included in the even-numbered line in the RAW data, and FIG. 6B shows the arrangement of the pixels in the image data after the sorting.

As shown in FIG. 6A, the odd-numbered line includes the pixels B0, B1, B2, ..., Bn representing blue (B), and the pixels G1, G3, G5, ..., G(2n+1) representing green (G) alternately in the RAW data. Further, the even-numbered line includes the pixels G0, G2, G4, ..., G(2n) representing green (G), and the pixels R0, R1, R2, ..., Rn representing red (R) alternately in the RAW data.

By performing the sorting in the arrangement of the pixels included in the odd-numbered line and the even-numbered line in the RAW data, such an arrangement of the pixels as shown in FIG. 6B can be obtained. In the sorting in the arrangement of the pixels included in the odd-numbered line, the first line includes the pixels G1, G3, G5, ..., G(2n+1) representing green (G), and the second line includes the pixels B0, B1, B2, ..., Bn representing blue (B). Further, in the sorting in the arrangement of the pixels included in the even-numbered line, the third line includes the pixels G0, G2, G4, ..., G(2n) representing green (G), and the fourth line includes the pixels R0, R1, R2, ..., Rn representing red (R). As described above, in the second example, the number of lines increases from two to four, and at the same time, the numbers of pixels included in the respective lines are equal to each other.

As explained hereinabove, by compressing the image data after sorting the pixels for each of the colors of the color filter used when generating the image, the continuity of the data value in the pixels adjacent to each other can be assured. Therefore, it is possible to realize highly efficient data compression, and/or reduce the influence of the compression and the expansion on the image quality. Further, by reducing the transfer frequency band (the transmission bit rate) between the frame memory control circuit 23 and the frame memory 30, it is possible to realize further expansion of the dynamic range, a higher resolution, or a higher frame rate of the HDR image while suppressing increase in cost, and so on.

For the compression of the image data in the line compression circuits 221 through 223 shown in FIG. 4, the continuity of the data values of the plurality of pixels consecutive in the one line or the two lines can be used. For example, as the compression method of the image data in the line compression circuits 221 through 223, an image encoding device and an image encoding method described in JP-A-2007-181051 can be used. The content will briefly be explained below.

The image encoding device includes a lossy encoding section, a lossless encoding section, and a redundant code counter, and a encoding control section. The lossy encoding section encodes the pixel data of an encoding target pixel by expressing it with a fixed-length code to provide a standard compression ratio in a lossy mode. The lossless encoding section encodes the pixel data of the encoding target pixel with a redundant code with respect to the fixed-length code if the compression ratio of the pixel data of the encoding target pixel is higher than the standard compression ratio in the lossless mode, and encodes the pixel data of the encoding target pixel while consuming the redundant code added to the fixed-length code if the compression ratio of the pixel data of the encoding target pixel is lower than the standard compression ratio. The redundant code counter counts up the redundant code and counts down the consumed redundant code when the encoding is performed in the lossless encoding section. The encoding control section continues the encoding operation by the lossless encoding section within the range in which the count value of the redundant code counter does not reach the value indicating the compression ratio lower than the standard compression ratio.

According to the image encoding device, by continuing the encoding operation by the lossless encoding section within the range in which the count value of the redundant code counter does not reach the value indicating the compression ratio lower than the standard compression ratio, the encoding in the lossless mode always has a high compression ratio equal to or higher than the standard compression ratio. Further, since the encoding is always performed at the standard compression ratio in the lossy mode, it is assured that the total compression ratio in both of the lossless mode and the lossy mode is a high compression ratio equal to or higher than the standard compression ratio. Further, since the lossless mode has priority, the compression ratio can be raised compared to the case of giving priority to the lossy mode in which the encoding is performed at the compression ratio equal to the standard compression ratio, and moreover, the reproducibility of the data is enhanced.

Referring again to FIG. 1, the interpolation circuit 25 performs the interpolation operation using the data values of the peripheral pixels on each of the pixels in the plurality of types of image data including the at least one type of image data, which is read out from the frame memory 30 and then expanded and restored by the expansion circuit 24. Thus, the interpolation circuit 25 outputs a plurality of types of RGB image data including red (R), green (G), and blue (B) components for each of the pixels.

Here, the plurality of types of RGB image data includes the image data A representing the image shot with the shortest exposure time T1, the standard image data B representing the standard image shot with the standard exposure time T2, and the image data C representing the image shot with the longest exposure time T3 in a time-series manner. The dynamic range expansion circuit 26 combines the plurality of types of RGB image data output from the interpolation circuit 25 to thereby generate the HDR image data representing a single color image with the dynamic range expanded.

Figure 7:
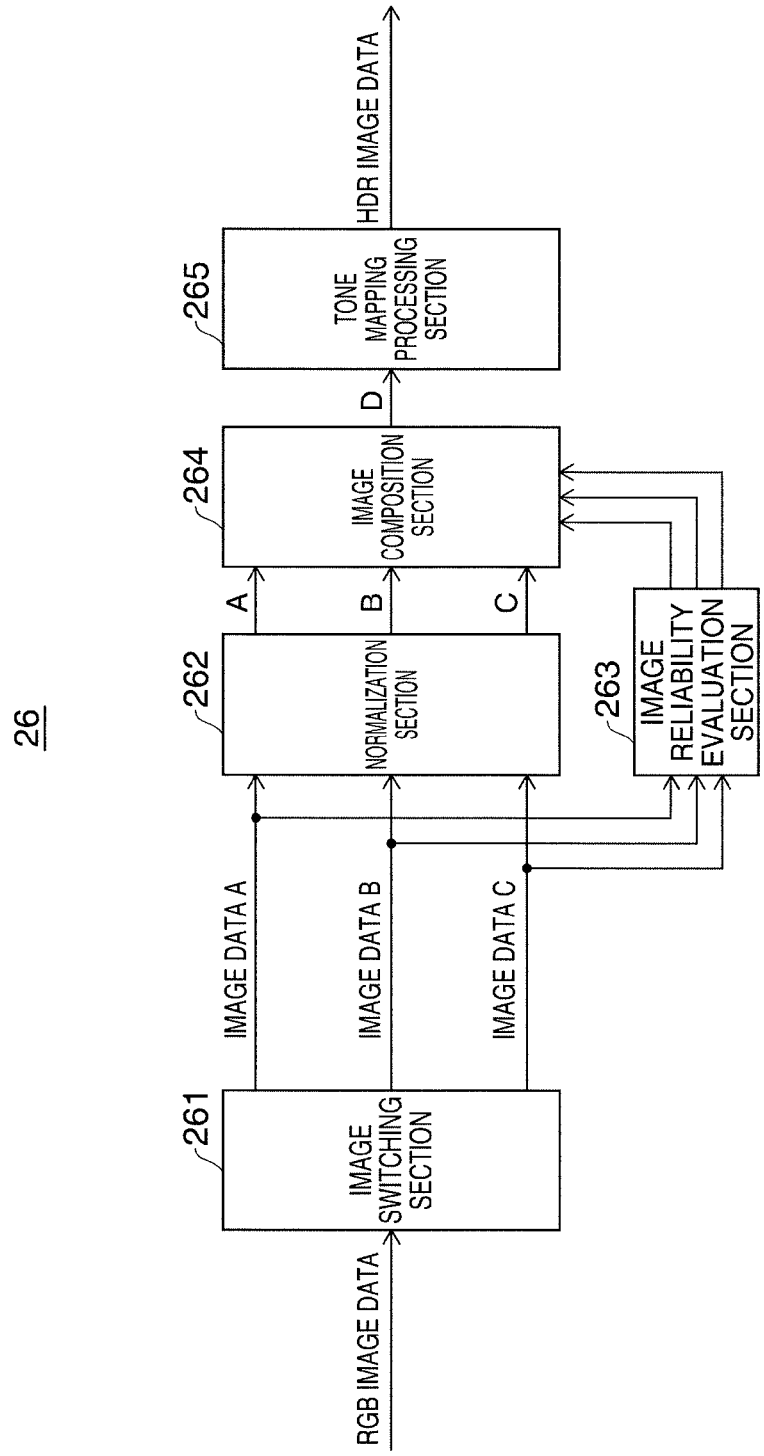
FIG. 7 is a block diagram showing a configuration example of a dynamic range expansion circuit shown in FIG. 1.

FIG. 7 is a block diagram showing a configuration example of the dynamic range expansion circuit shown in FIG. 1. The dynamic range expansion circuit 26 includes an image switching section 261, a normalization section 262, an image reliability evaluation section 263, an image composition section 264, and a tone mapping processing section 265.

The image switching section 261 separates the image data A, B, and C supplied sequentially from the interpolation circuit 25, and then supplies them to the normalization section 262 and the image reliability evaluation section 263. The normalization section 262 normalizes the image data A, B, and C. In parallel thereto, the image reliability evaluation section 263 evaluates the reliability of the image data A, B, and C, and then supplies the image composition section 264 with the evaluation result of the reliability.

The image composition section 264 performs the high dynamic range composition on the image data A, B, and C normalized by the normalization section 262 based on the evaluation result of the reliability supplied from the image reliability evaluation section 263 to thereby generate composite image data D representing the image with the dynamic range expanded.

The tone mapping processing section 265 performs a tone mapping process of matching the number of bits of the composite image data D, which represents the image with the dynamic range expanded, and is output from the image composition section 264, with the number of bits (e.g., 8 bits with respect to each of the green (G) component, the blue (B) component, and the red (R) component) of the RAW data obtained by the image data acquisition section 21.

Then, an operation example of the dynamic range expansion circuit shown in FIG. 7 will be explained.

Firstly, an example of the normalization process performed in the normalization section 262 shown in FIG. 7 will be explained. In the following formulas, "x,y" represents the coordinate of the pixel, and "R" represents the R component. It is assumed that the data values of the R component of the image data A, B, and C, which are to be input to the normalization section 262, and on which the normalization is to be performed, are A_T1(x,y,R), B_T2(x,y,R), and C_T3(x.y.R), respectively. Further, it is assumed that the data values of the image data A, B, and C normalized by the normalization section 262 are A_NT3(x,y,R), B_NT3(x,y,R), and C_NT3 (x,y,R), respectively. The relationship between the both data values in the normalization is represented by the following formulas.

$$A\_NT3(x,y,R)=A\_T1(x,y,R)\times(T3/T1)$$

$$B\_NT3(x,y,R)=B\_T2(x,y,R)\times(T3/T2)$$

$$C\_NT3(x,y,R)=C\_T3(x,y,R)$$

Although these formulas relate to the R component of the image data, these formulas are also true with respect to the G component and the B component in a similar manner.

Figure 8A:
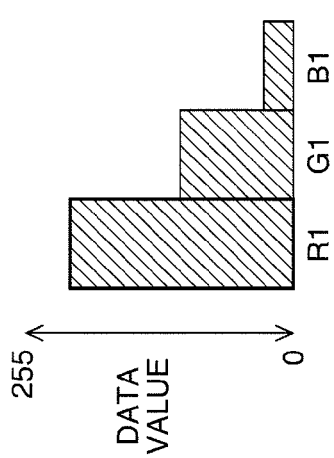
FIGS. 8A through 8C are diagrams showing color components constituting orange in images with respective exposure times different from each other.
Figure 8B:
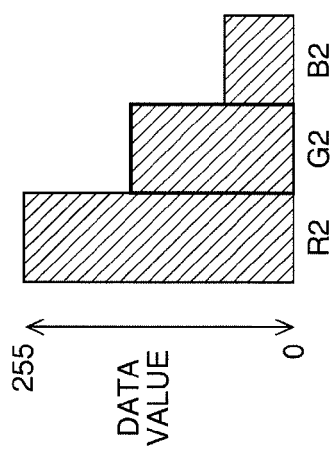
Figure 8C:
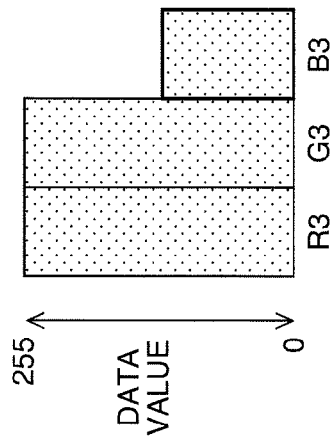

Then, a first example of the reliability evaluation of the image data performed by the image reliability evaluation section 263 shown in FIG. 7 will be explained. FIGS. 8A through 8C show the data values of the R, G, and B components constituting orange color in the image obtained by shooting the same shooting object with the respective exposure times different from each other. In FIGS. 8A through 8C, the R, G, and B components are separated in the horizontal axis, and the vertical axis represents the data value of each of the components. Further, FIG. 8A shows the data value of the image data A representing the image shot with the shortest exposure time T1, FIG. 8B shows the data value of the image data B representing the image shot with the standard exposure time T2, and FIG. 8C shows the data value of the image data C representing the image shot with the longest exposure time T3.

The image reliability evaluation section 263 evaluates the reliability of the image data based on the data value to thereby obtain the reliability level as a value representing the evaluation result of the reliability. In the present embodiment, the larger the data value is, the higher the S/N ratio is. Therefore, the larger the data value is, the higher reliability level is provided to the data value. It should be noted that if the data value is too large, and reaches the maximum value of 255 (saturated), the correct data value of the original image fails to be obtained. Therefore, it is arranged that the data value (e.g., 224) slightly lower than the maximum value of 255 is provided with the maximum value of the reliability level.

Such provision of the reliability level as described above is realized by substituting the data value in a formula set previously, or by looking up a look-up table (LUT) based on the data value. Hereinafter, a formula for calculating the reliability level $E\_T1(x,y,R)$ in the case in which the data value of the image data $A\_T1(x,y,R)$ exceeds 224 will be described as an example.

$$\text{if } A\_T1(x,y,R)>224$$

$$\text{then } E\_T1(x,y,R)=(255-A\_T1(x,y,R))/31$$

$$\text{else } E\_T1(x,y,R)=A\_T1(x,y,R)/224$$

Although these formulas relate to the R component of the image data, these formulas are also true with respect to the G component and the B component in a similar manner.

The numerical value "31" in the formula described above is a difference between the maximum value 255 of the data value and the data value 224 at which the reliability level takes the maximum value. By dividing the difference between the maximum value 255 and the data value of the image data A_T1(x,y,R) by the difference between the maximum value 255 of the data value and the data value 224, it is possible to lower the reliability level when the data value of the image data A_T1(x,y,R) approaches the saturation.

The image reliability evaluation section 263 performs the evaluation of the reliability described hereinabove, and then outputs the reliability level thus calculated to the image composition section 264. It should be noted that the formula for calculating the reliability level is not limited to the type described above, but any type of formula can be adopted providing the reliability level provides a measure of the reliability of the data value taking the output characteristics or the noise characteristics into consideration. Further, the evaluation of the reliability is not limited to using of the reliability level, but can be arranged to output a signal for specifying the image data having the highest reliability.

If the data values shown in FIGS. 8A through 8C are evaluated with the formula described above, it results that the R component R1 of the image data A shown in FIG. 8A obtains a higher reliability level than those of the R component R2 of the image data B shown in FIG. 8B and the R component R3 of the image data C shown in FIG. 8C with respect to the R component. Further, with respect to the G component, it results that the G component G2 of the image data B shown in FIG. 8B obtains the higher reliability level than those of the G component G1 of the image data A shown in FIG. 8A and the G component G3 of the image data C shown in FIG. 8C. Further, with respect to the B component, it results that the B component B3 of the image data C shown in FIG. 8C obtains the higher reliability level than those of the B component B1 of the image data A shown in FIG. 8A and the B component B2 of the image data B shown in FIG. 8B.

Then, a first example of the image composition process performed by the image composition section 264 shown in FIG. 7 will be explained. The image composition section 264 selects the image data with the highest reliability level out of the image data A, B, and C with respect to each of the R, G, and B components. Then, the image composition section 264 combines the R, G, and B components of the image data thus selected to thereby generate the composite image data D representing the orange color.

FIGS. 9A through 9D are diagrams for explaining the first example of the image composition process. FIGS. 9A through 9C respectively show the data values of the color components of the image data A, B, and C normalized by the normalization section 262 shown in FIG. 1, and FIG. 9D shows the data values of the color components of the composite image data D composed by the image composition section 264 shown in FIG. 7.

The image composition section 264 selects the R component R1 of the image data A shown in FIG. 9A, the G component G2 of the image data B show in FIG. 9B, and the B component B3 of the image data C shown in FIG. 9C, and then combines them to thereby generate the composite image data D shown in FIG. 9D. The composite image data D is generated based on the R component R1 corresponding to the short-time exposure with unsaturated data value shown in FIG. 8A, the G component G2 corresponding to the standard exposure with appropriate data value shown in FIG. 8B, and the B component B3 corresponding to the long-time exposure with improved data value shown in FIG. 8C, and therefore has the dynamic range expanded compared to the image data B corresponding to the standard exposure shown in FIG. 8B.

It should be noted that in the composite image data D shown in FIG. 9D, the maximum value of the data value exceeds 255 due to the normalization. Therefore, the tone mapping processing section 265 shown in FIG. 7 performs the tone mapping process of matching the number of bits of the composite image data D output from the image composition section 264 with the number of bits (e.g., 8 bits with respect to each of the R, G, and B components) of the RAW data obtained by the image data acquisition section 21. The tone mapping process is performed by, for example, multiplying the data value of each of the color components of the composite image data D by (T1/T3).

Then, a second example of the reliability evaluation of the image data and the image composition process will be explained. In the second example, the image composition section 264 mixes the same color components in the plurality of image data A, B, and C with respective exposure amounts different from each other to thereby generate the composite image data D. In order to achieve the above, the image reliability evaluation section 263 calculates mixture fractions (weighting factors) in each of the color components of the plurality of image data A, B, and C as the reliability evaluation result, and then supplies the image composition section 264 with the mixture fractions. The image composition section 264 mixes the same color components in the plurality of image data A, B, and C in accordance with the mixture fractions thus supplied.

As a result of such a mixing process, the R component R1 of the image data A, the R component R2 of the image data B, and the R component R3 of the image data C are mixed with each other, and thus, the R component of the composite image data D is generated. Similarly, the G component G1 of the image data A, the G component G2 of the image data B, and the G component G3 of the image data C are mixed with each other, and thus, the G component of the composite image data D is generated. Further, the B component B1 of the image data A, the B component B2 of the image data B, and the B component B3 of the image data C are mixed with each other, and thus, the B component of the composite image data D is generated. The composite image data D is constituted by the R, G, and B components each obtained by mixing.

It is also possible for the image reliability evaluation section 263 to calculate the weighting factors in each of the color components of the plurality of image data A, B, and C in the following manner. Here, it is assumed that the weighting factors represent the mixture fractions of the image data A, B, and C, and the greater the weighting factor is, the greater the mixture fraction is. The weighting factors in the R component of the image data A, B, and C_W_T1(x,y,R), W_T2(x,y,R), and W_T3(x,y,R) are calculated by the following formulas based on the reliability level.

$W\_T1(x,y,R)=E\_T1(x,y,R)/E\mathrm{sum}$ $W\_T2(x,y,R)=E\_T2(x,y,R)/E\mathrm{sum}$ $W\_T3(x,y,R)=E\_T3(x,y,R)/E\mathrm{sum}$ where, $E\mathrm{sum}=E\_T1(x,y,R)+E\_T2(x,y,R)+E\_T3(x,y,R)$ Although these formulas relate to the R component of the image data, these formulas are also true with respect to the G component and the B component in a similar manner.

The weighting factors calculated by the image reliability evaluation section 263 are supplied to the image composition section 264. The image composition section 264 multiplies the color components of the respective image data A, B, and C by these weighting factors, then adds the data values obtained by the multiplication to each other for each of the color components to thereby generate the composite image data D.

$D(x,y,R)=W\_T1(x,y,R)\times A\_NT3(x,y,R)$ $+W\_T2(x,y,R)\times B\_NT3(x,y,R)$ $+W\_T3(x,y,R)\times C\_NT3(x,y,R)$ Although the formula relates to the R component of the image data, the formula is also true with respect to the G component and the B component in a similar manner.

Figure 10:
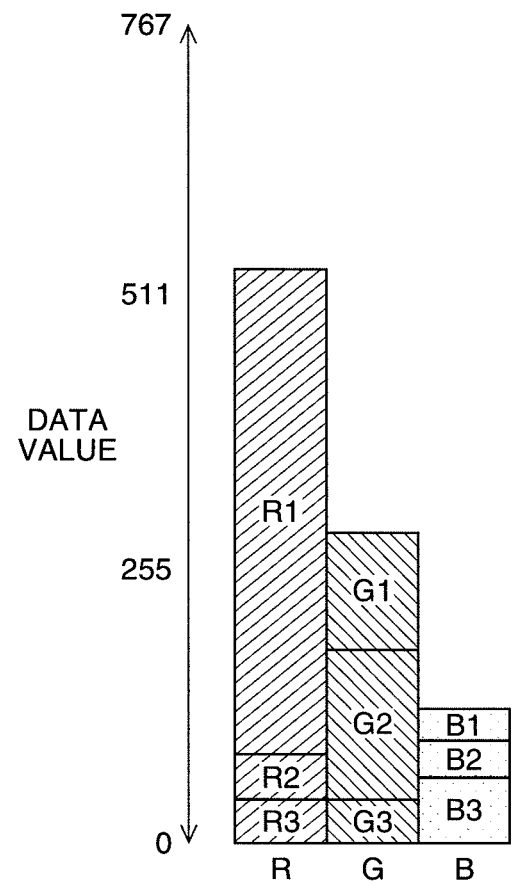
FIG. 10 is a diagram showing an example of mixture fractions of an original image data in composite image data.

FIG. 10 is a diagram showing an example of the mixture fractions of an original image data in the composite image data. Although in this example, the R, G, and B components of the composite image data D respectively include the R, G, and B components of all of the image data A, B, and C, it is also possible to eliminate the color component of the image data with the lowest reliability by setting the weighting factor of the color component of the image data with the lowest reliability to zero.

According to the dynamic range expansion process described above, the reliability of the plurality of image data in which the shooting object is shot with the respective exposure amounts different from each other can be evaluated for each of the color components of the image data. Further, it is possible to adopt the color component with high reliability out of the color components of the image data based on the reliability thus evaluated, and to generate the composite image data by combining the color components thus adopted.

FIGS. 11A through 11D are diagrams showing an example of images shot by a drive recorder to which the invention is applied. FIGS. 11A through 11D show the images obtained by shooting the vicinity of the end of a tunnel while changing the exposure time in three levels, and the composite image obtained by combining these images.

FIG. 11A shows the image corresponding to the short-time exposure. In the case of the short-time exposure, although the object located outside the tunnel is shot clearly, the object located inside the tunnel is unclear due to blocked up shadows. On the other hand, FIG. 11C shows the image corresponding to the long-time exposure. In the case of the long-time exposure, although the object located inside the tunnel is shot clearly, the object located outside the tunnel is unclear due to blown out highlights. Further, FIG. 11B shows the image corresponding to the standard exposure. In the case of the standard exposure, the blocked up shadows occur in a portion located inside the tunnel, and the blown out highlights occur in a portion located outside the tunnel.

FIG. 11D shows the composite image obtained by combining the images shown in FIGS. 11A through 11C. By clipping images of the areas (pixels) with appropriate luminance from the images shown in FIGS. 11A through 11C, and then combining the images thus clipped, a single (a frame of) image without block up shadows or blown out highlights can be obtained.

Referring again to FIG. 1, the moving image processing circuit 40 compresses the HDR image data generated by the HDR image processing circuit 20 in accordance with a moving image compression method such as MPEG (moving picture experts group) to thereby generate the image data to be stored. Further, the moving image processing circuit 40 stores the image data to be stored on the recording medium such as an SD card or a hard disk drive. The SD card is a portable recording medium belonging to a flash memory. Alternatively, it is also possible that an image data storage section not shown transmits the image data, which is to be stored, to another terminal via a network, and the terminal stores the image data.

Then, a second embodiment of the invention will be explained.

Figure 12:
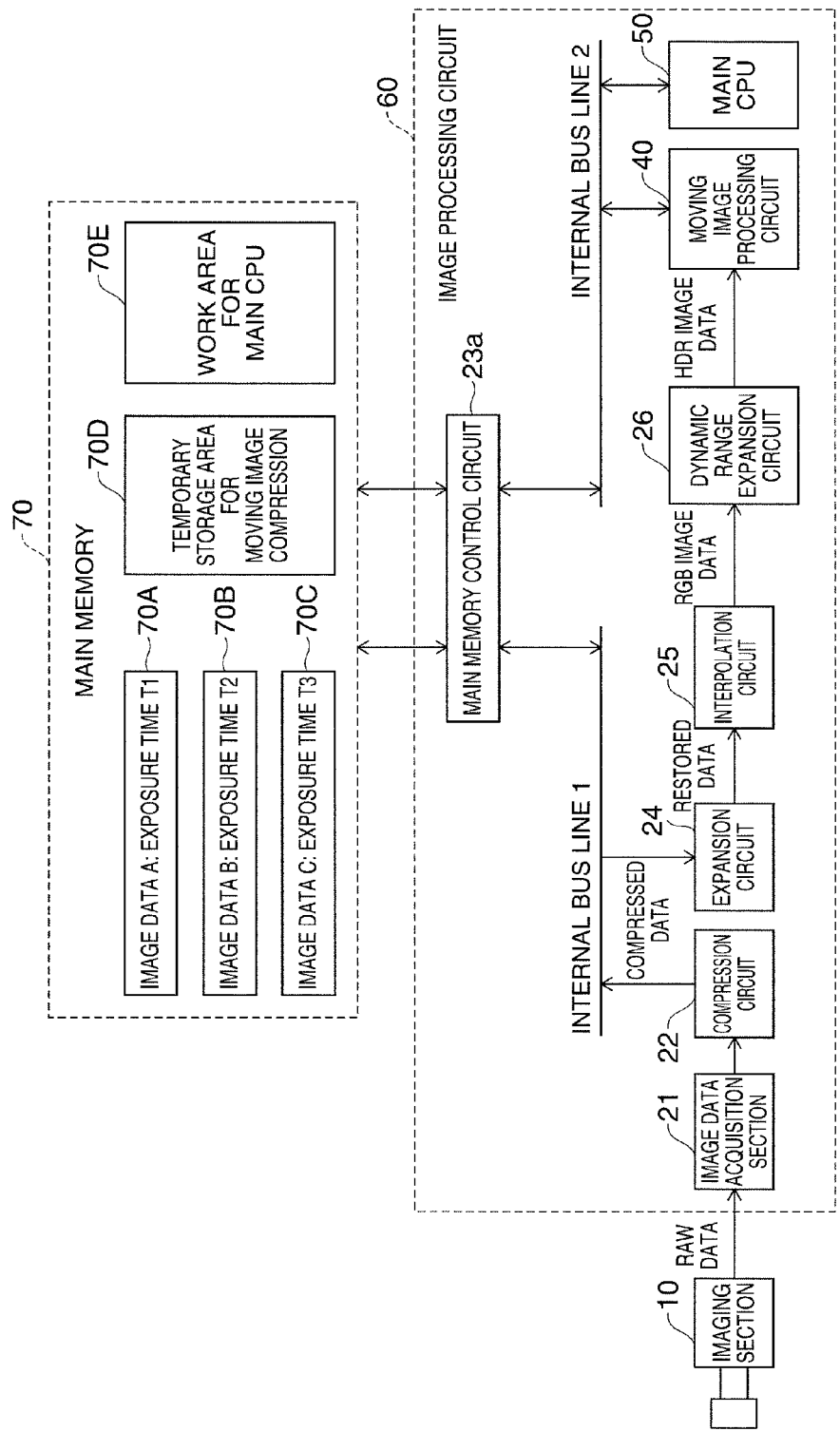
FIG. 12 is a block diagram showing an electronic apparatus using an image processing device according to a second embodiment of the invention.

FIG. 12 is a block diagram showing a configuration example of an electronic apparatus using an image processing device according to the second embodiment of the invention. In the second embodiment, the HDR image processing circuit 20 and the moving image processing circuit 40 in the first embodiment shown in FIG. 1 are incorporated in a system-on-chip together with a main CPU 50 to constitute an image processing circuit 60. Further, a main memory 70 and a main memory control circuit 23a are used instead of the frame memory 30 and the frame memory control circuit 23. Other points are the same as those of the first embodiment.

The main CPU 50 sets a variety of parameters used when the dynamic range expansion circuit 26 performs the dynamic range expansion operation, controls the moving image compression operation of the moving image processing circuit 40, and performs control of a file system used for storing the image data to be stored.

The main memory 70 includes storage areas 70A, 70B, and 70C for respectively storing the image data A, B, and C output from the compression circuit 22, a temporary storage area 70D used when the moving image processing circuit 40 performs the moving image compression operation, and a work area 70E for the main CPU 50.

The main memory control circuit 23a is connected to the compression circuit 22 and the expansion circuit 24 via an internal bus line 1. The main memory control circuit 23a controls the main memory 70 so as to store the plurality of types of image data A, B, and C output from the compression circuit 22 as much as at least one frame for each of the types, and at the same time, reads out the image data A, B, and C from the main memory 70 and supplies them to the expansion circuit 24.

Further, the main memory control circuit 23a is connected to the moving image processing circuit 40 and the main CPU 50 via an internal bus line 2. The main memory control circuit 23a controls the main memory 70 so as to store the image data output from the moving image processing circuit 40, and at the same time, reads out the image data from the main memory 70 and supplies the moving image processing circuit 40 with the image data. Further, the main memory control circuit 23a controls the main memory 70 so as to store the parameters and so on output from the main CPU 50, and at the same time, reads out the parameters and so on from the main memory 70 and supplies them to the main CPU 50.

Also in such a case of integrating the frame memory for the dynamic range expansion operation with the memory of the posterior system as in the present embodiment, by reducing the amount of image data using the compression circuit 22, it is possible to reduce the influence on the other functions, and solve the problem and the restriction regarding the memory capacity and the internal bus frequency.

Although in the embodiments described above, there is explained the case in which in the color filter of the imaging section 10 it is assumed that the first color component is blue (B), the second color component is green (G), and the third color component is red (R), the invention can also be applied to other cases. For example, it is also possible to assume that the first color component is a luminance signal (Y), and the second and third color components are color difference signals (Cr, Cb). Further, regarding the pixel arrangement in the color filter of the imaging section 10, the positions or the orders of the respective colors can also be different, or the horizontal positions in the odd-numbered lines and the even-numbered lines can also be different.

What is claimed is:

1. An image processing device comprising:
   an image data acquisition section adapted to first acquire a plurality of types of image data respectively representing a plurality of color images in which a shooting object is shot with respective exposure amounts different from each other;
   a compression circuit adapted to then sort pixels included in a plurality of lines corresponding respectively to color components in at least one type of image data obtained by the image data acquisition section, the compression circuit sorting the pixels in an arrangement included in the plurality of lines adjacent to each other in the at least one type of image data into
      a row of the pixels representing a first color component,
      a row of the pixels representing a second color component, and
      a row of the pixels representing a third color component;
   a memory adapted to then store the sorted plurality of types of image data, which is obtained by the image data acquisition section, as much as at least one frame for each of the types, wherein the compression circuit is further adapted to then compress the stored sorted image data;
   an expansion circuit adapted to expand the image data compressed out of the plurality of types of image data read out from the memory, and then restore the arrangement of the pixels included in the plurality of lines in the image data expanded;
   an interpolation circuit adapted to perform an interpolation operation using data values of peripheral pixels on each of the pixels in the plurality of types of image data including the at least one type of image data, which is read out from the memory and then expanded and restored by the expansion circuit, to thereby output image data including the plurality of color components for each of the pixels; and
   a dynamic range expansion circuit adapted to combine the plurality of types of image data output from the interpolation circuit to thereby generate composite image data representing a single color image with a dynamic range expanded.

2. The image processing device according to claim 1, wherein:
   an odd-numbered line in the image data obtained by the image data acquisition section includes the pixels representing the first color component and the pixels representing the second color component, and
   an even-numbered line in the image data includes the pixels representing the second color component and the pixels representing the third color component.

3. The image processing device according to claim 2, wherein:
   the compression circuit sorts the pixels in an arrangement included in two lines adjacent to each other in the at least one type of image data into
      one row of the pixels representing the first color component,
      two rows of the pixels representing the second color component, and
      one row of the pixels representing the third color component.

4. An electronic apparatus comprising:
an imaging section adapted to generate a plurality of types of image data respectively representing a plurality of color images in which a shooting object is shot with respective exposure amounts different from each other by shooting the shooting object with the respective exposure amounts different from each other; and
the image processing device according to claim 3 to which the plurality of types of image data generated by the imaging section is supplied.

5. An electronic apparatus comprising:
an imaging section adapted to generate a plurality of types of image data respectively representing a plurality of color images in which a shooting object is shot with respective exposure amounts different from each other by shooting the shooting object with the respective exposure amounts different from each other; and
the image processing device according to claim 2 to which the plurality of types of image data generated by the imaging section is supplied.

6. The image processing device according to claim 1, wherein:
the compression circuit sorts the pixels in an arrangement included in the plurality of lines in the at least one type of image data into the plurality of lines corresponding respectively to the color components in accordance with a setting signal representing information of a color filter used when an image represented by the image data obtained by the image data acquisition section is generated.

7. An electronic apparatus comprising:
an imaging section adapted to generate a plurality of types of image data respectively representing a plurality of color images in which a shooting object is shot with respective exposure amounts different from each other by shooting the shooting object with the respective exposure amounts different from each other; and
the image processing device according to claim 6 to which the plurality of types of image data generated by the imaging section is supplied.

8. An electronic apparatus comprising:
an imaging section adapted to generate a plurality of types of image data respectively representing a plurality of color images in which a shooting object is shot with respective exposure amounts different from each other by shooting the shooting object with the respective exposure amounts different from each other; and
the image processing device according to claim 1 to which the plurality of types of image data generated by the imaging section is supplied.

9. The image processing device according to claim 1, wherein:
the color components comprise at least the first and second color components in the at least one type of image data, the first color component being a different color than the second color component; and
the compression circuit is adapted to compress all of the image data for pixels of the first color component before compressing all of the image data for pixels of the second color component.

10. The image processing device according to claim 9, wherein:
the image data comprises raw image data that is sorted in the memory in order based on the first color component and the second color component before being read out for compression.

11. The image processing device according to claim 1, further comprising:
a buffer memory adapted to store the image data sorted by color component before compression by the compression circuit.

12. The image processing device according to claim 11, wherein:
the color components comprise at least the first and second color components in the at least one type of image data, the first color component being a different color than the second color component; and
the buffer memory is adapted to store all image data of the first color component in contiguous order and store all image data of the second color component separately in contiguous order.

* * * * *